Patented Feb. 10, 1942

2,272,923

UNITED STATES PATENT OFFICE 2,272,923

LUBRICANT

Carl F. Prutton, Cleveland Heights, Ohio, assignor, by mesne assignments, to The Lubri-Zol Development Corporation, Cleveland, Ohio, a corporation of Delaware No Drawing. Application December 12, 1938, Serial No. 245,225

4 Claims. (Cl. 252—39)

As indicated, this invention relates to the field of lubrication and more particularly to the lubrication of the working parts of certain types of internal combustion engines, especially Diesel engines.

This application is a continuation in part of my co-pending application Serial No. 737,070, filed July 26, 1934.

Since Diesel engines generally operate under conditions of high temperature and extreme pressure, considerable difficulty has been encountered with the formation of gums and sludge in the crankcase and on the working parts, necessitating frequent overhauls and reducing the efficiency of the engine. Ring-sticking has been especially troublesome in many cases.

It is, therefore, a principal object of this invention to provide a new lubricating composition and method of lubricating whereby difficulties of the type mentioned above may be substantially reduced or overcome entirely.

Other objects of the invention will appear as the description proceeds.

To the accomplishment of the foregoing and related ends this invention, then, comprises the means hereinafter fully described and particularly pointed out in the claims. The following description sets forth in detail certain approved combinations of ingredients embodying the invention, such disclosed means constituting, however, but certain of the various forms in which the principles of the invention may be used.

Broadly stated, this invention comprises the use as an addition agent in lubricating compositions and particularly in lubricating compositions designed for use in Diesel engines of a material selected from the class consisting of the products of the hydrolysis of a halogenated organic acid and the esters and salts derived from such hydrolyzed acids.

An example of one method of preparing a lubricant of the type contemplated is as follows: Stearic acid is chlorinated until it contains an amount of chlorine approximately equivalent to that of dichlor-stearic acid (or preferably chlorinated to a higher degree and the lower chlorinated products removed), and the chlorinated stearic acid so formed is dissolved in an excess of an aqueous solution of sodium hydroxide. The solution then contains the sodium salt of the chlorinated stearic acid together with an excess of sodium hydroxide, for example, in an amount equivalent to that required to neutralize the acid. This solution is heated, usually for several hours, until additional sodium chloride is no longer formed at an appreciable rate. The solution is then acidified, with hydrochloric or sulphuric acid, for example, to set free the hydrolyzed organic acid which, when hot, separates from the aqueous layer as a lighter, oilier layer.

About 1½% of the hydrolyzed acid thus formed may then be dissolved in a mineral lubricating oil of a type suitable for Diesel engine crankcase lubrication together with an amount of calcium hydroxide somewhat in excess of that required to neutralize the acid. The mixture is heated slowly until it reaches a temperature of about 300° F. and held at that temperature for about ½ hour. At this point a filter aid, such as clay, is preferably added in an amount of about .2% or less and the oil filtered, for example, through a filter press while still hot to remove the excess lime and any other insoluble matter as well as to improve the color of the oil and thus produce the final product. This product may still contain halogen if only part of the chlorine was removed by hydrolysis.

An alternative method of forming the calcium soap is to add a water soluble inorganic calcium salt to the hydrolyzed sodium salt solution and dissolve the water-insoluble calcium salt thus formed in oil.

Another example of a method of preparing a lubricant of the type contemplated is as follows: Stearic acid is chlorinated until it contains an amount of chlorine equivalent to about 2½ atoms per molecule. This chlorinated acid is then treated with steam until hydrogen chloride is no longer evolved at an appreciable rate. The hydrolyzed acid thus obtained may be employed in the same manner as that in the preceding examples or any desired soap or ester may be prepared therefrom and used as the lubricant addition agent.

It is often desired that a portion of the halogen be retained on the molecule, especially when extreme pressure operating conditions are to be encountered. As indicated above, this end may be attained by proper control of the hydrolysis with particular attention being given the length of time of reaction, the reagent employed, and the temperature at which the reaction takes place. The longer the time, the stronger the reagent, and the higher the temperature, the greater is the probability that substantially all of the halogen will have been removed by hydrolysis. Sodium hydroxide is a more effective hydrolyzing agent than sodium carbonate, for example. Another factor affecting the degree of hydrolysis is the position of the halogen atoms on the acid molecule, those in the $\alpha$ or $\beta$ positions being relatively difficult to hydrolyze. When the hydrolysis is carried on at a high temperature, a certain amount of the halogen will be driven off in the form of a hydrogen halide such as HCl, for example, thus creating double bonds in the molecules. The product of hydrolysis may, therefore, consist of a mixture of compounds containing halogen, double bonds, and hydroxyl groups, depending on the conditions under which the reaction was conducted and the nature of the initial composition.

Acids other than stearic acid may be halogenated and treated as described above to obtain products suitable for use in accordance with this invention, for example:

Fatty acids, e. g.:

| Caproic | Oleic |
|---|---|
| Lauric | Linoleic |
| Myristic | Stearolic |
| Palmitic | Linolinic |

Naphthenic acids, e. g.:

Hexahydro benzoic acid
    Naphthenic acids derived from petroleum

Aromatic fatty acids, e. g.:

| Phenyl | |
|---|---|
| Tolyl | |
| Xylyl | Stearic acid |
| Xenyl | Palmitic acid |
| Naphthyl | Lauric acid |
| Anthracyl | |

It is to be understood, of course, that the above examples are for illustration only and are not intended in any way to limit the scope of this invention.

These acids may contain various substituent groups such as:

Oxygen-bearing substituents:

The ether group
The
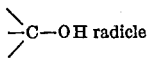
    $\diagdown C{-}OH$ radicle

The carbonyl radicle,
    $\diagdown C{=}O$

For example as existing in
    Amides
    Aldehydes
    Ketones
    Thio-acids and esters and salts of thio-acids Inorganic substituents in which the oxygen atom is directly attached to the carbon atom:

| Arsenite | Thiophosphate |
|---|---|
| Benzamide | Thiophosphite |
| Hypochlorite | Beta hydroxylamine |
| Phosphite | |

Other oxygen-bearing substituents as follows:

| Arsenate | Perchlorate |
|---|---|
| Chlorate | Phosphate |
| Chlorite | Sulphate |
| Cyanate | Sulphite |
| Alpha hydroxylamine | Sulphinic acid |
| Nitrate | Sulphone |
| Nitrite | Sulphonic acid |
| Nitro | Sulphoxide |
| Nitroso | Thio-sulphate |
| Oxime | |

Oxygen-free substituents:

Amino, and substituted amino groups
    Imino
    Azo
    Hydrozo
    Hydrazine
    Nitrile
    Iso nitrile Aryl, and substituted aryl, such as:

| Phenyl | Tolyl |
|---|---|
| Naphthyl | Xylyl |
| Anthracyl | Benzyl |

Alkyl, such as:

| Methyl | Propyl |
|---|---|
| Ethyl | Iso-propyl |

Of course, such substituent groups should not be included as will render the particular final product oil-insoluble or deleterious in its effect, i. e. unstable and corrosive.

Salts other than the calcium salts may be employed when such salts are sufficiently oil-soluble and stable. Salts of magnesium, aluminum and zinc are generally suitable and also salts of organic bases where these themselves are not sludge-forming in character.

The following list illustrates a few of the types of alcohols suitable for forming esters of the hydrolyzed halogenated acids in accordance with my invention:

Methyl alcohol
Ethyl alcohol
Ethylene glycol
    (Mono- and di-esters)
Di-ethylene glycol
    (Mono- and di-esters)
Benzyl alcohol
Chlor-benzyl alcohol The final product has been found to possess many advantages over the ordinary mineral oil lubricants. One of the most important is its ability to dissolve the gums and carbon binders which are usually responsible for the formation of hard deposits, thus rendering such deposits soft and facilitating their removal. In a similar fashion, the gummy material in sludge is acted upon so that it can no longer carry small particles of grit and dirt which formerly have been responsible for much excessive wear. The addition agents of this invention are particularly suited for their purpose since, in addition to their effectiveness, they are quite stable to the high temperatures encountered in use. Although strongly polar compounds and hence of advantage in enabling the lubricating composition to resist extreme pressures of 10,000 lbs. per square inch and more, they are relatively non-corrosive to the parts being lubricated.

Only small quantities of the addition agent need be employed in conjunction with the mineral oil base, concentrations of from about 0.1% to about 2% by weight of the salt or ester, based on the amount of mineral oil, and even smaller amounts of the hydrolyzed acid, often being quite sufficient to obtain the effect desired. For certain uses, however, it may be found desirable to employ up to about 10% or more.

Certain combinations of addition agents present various advantages, i. e.:

(1) Salt with acid
(2) Salt with ester
(3) Ester with acid
(4) Salt, ester, and acid The solubility of the salt is improved by the presence of a relatively small amount of an oil soluble acid. This acid may be:

(1) The hydrolyzed halogenated acid
(2) The unhydrolyzed halogenated acid
(3) Any oil-soluble organic acid such as:
    oleic, naphthenic When the hydrolyzed halogenated acid is employed alone, concentrations of about one-tenth of those given above for the salts and esters are generally quite sufficient. Still smaller percentages of the acid may be employed when the salt or ester is present. A typical example of such a composition is the following:

| | Per cent |
|---|---|
| Oleic acid or the acid formed by the hydrolysis of chlorinated stearic acid | .16 |
| Salt | 1.3 |
| Mineral oil | Remainder |

When used in conjunction with a mineral lubricating oil, it is obvious that generally only such amounts of the addition agent may be included as are soluble in the specified amount of oil. By the term "soluble" as herein used it is intended to indicate the ability to form not only true solutions but also any form of substantially permanently homogeneous composition when incorporated in mineral oil. With most of the compounds there is usually little difficulty, especially if the incorporation is effected in the manner described in Cornell Patent No. 2,042,880, and since quite small percentages often give remarkably improved results it is seldom of extreme importance that the addition agents be oil-soluble in all proportions. Also, for uses other than as crank-case lubricants, certain compounds are of value as gelling or bodying agents when used in amounts greater than are strictly soluble.

Since, in general, the loss of the addition agent by volatilization will be less for compounds having a low volatility, the vapor pressure of the compounds should, for most purposes, be less than atmospheric pressure at temperatures up to 140° C. It is usually desirable, especially for use in internal combustion engines, that the vapor pressure be less than atmospheric at temperatures up to 170° C. In the case of compounds which are stable at temperatures up to their boiling points, this condition may be expressed by stating that the boiling point of the compound should, in general, be higher than 140° C., and for certain uses, such as in internal combustion engines, higher than 170° C. It should be noted, in this connection, that the addition agents of this invention are relatively non-volatile and, therefore, tend to remain in the engine and perform their function.

While mineral oil generally is the principal ingredient of the lubricant, it is not essential that it be the only ingredient other than the addition agent, provided that there be no additional ingredient which is incompatible with such addition agent. It is within the contemplation of this invention to include, if necessary or desirable, such other addition agents as are commonly added to reduce the chemical activity or rate of oxidation, or to improve the viscosity index or cold test of the lubricant, and a lubricating composition, according to this invention which also has a separate oiliness increasing agent has been found to be especially effective.

It is believed that under conditions of extreme pressure, the halogenated addition agents react chemically or physico-chemically with the metallic surfaces to form a non-fluxing surface which will not seize or score. This invention is not intended to be limited, however, by any particular theory or explanation of the action upon the metallic surfaces.

All the various halogens are effective when employed in accordance with the present invention but chlorine is generally preferred inasmuch as it is the least expensive and one of the most effective of the halogens. Bromine and fluorine are more expensive and the latter is relatively difficult to handle but they are each usable in accordance with this invention. Iodine is not so readily obtainable as the other halogens and is quite expensive but it also is satisfactory in providing effective addition agents. It should also be noted that two or more different halogens may be present in the same molecule. The brom-chlor and fluorinated chlorine or bromine compounds give especially satisfactory results.

The fact that the addition agents of this invention are more or less complex mixtures, promotes their oil-solubility and is probably partly responsive for their gum-solvent action. They are also highly polar compounds and hence, strongly adsorbed.

While the lubricating compositions which have been described herein as illustrating one embodiment of the invention have been generally referred to as "oils," i. e., liquids, this invention is, however, also applicable to the solid and semi-solid types of lubricants commonly referred to in the trade as greases, bodied oils, etc. In this connection is should be noted that certain of the addition agents contemplated for use herein may be employed for the additional purpose of bodying or thickening the lubricant to which they are added.

Other modes of applying the principle of the invention may be employed, change being made as regards the details described, provided the features stated in any of the following claims, or the equivalent of such, be employed.

I therefore particularly point out and distinctly claim as my invention:

1. A lubricating composition containing as a principal lubricating constituent a major amount of mineral lubricating oil with the properties of such composition affecting its use as an extreme pressure lubricant under conditions of temperature and pressure such as normally exert a decomposing influence on organic halogen compounds improved by the inclusion in the composition of a minor amount, based on the amount of mineral lubricating oil, of a halogen bearing hydroxy organic composition selected from the class consisting of: (a) the halogen bearing product produced by first halogenating an organic acid, then partially hydrolyzing the halogenated organic acid to remove the relatively active halogen from the molecule and substituting a hydroxyl group in place thereof; (b) the halogen bearing products produced by forming esters of the material identified under (a) above; and (c) halogen bearing salts of the material identified under (a) above.

2. A lubricating composition containing as a principal lubricating constituent a major amount of mineral lubricating oil with the properties of such composition affecting its use as an extreme pressure lubricant under conditions of temperature and pressure such as normally exert a decomposing influence on organic halogen compounds improved by the inclusion in the composition of a minor amount, based on the amount of mineral lubricating oil, of a halogen bearing hydroxy organic composition selected from the class consisting of: (a) the halogen bearing product produced by first halogenating a fatty acid, then partially hydrolyzing the halogenated fatty acid to remove the relatively active halogen from the molecule and substituting a hydroxyl group in place thereof; (b) the halogen bearing products produced by forming esters of the material identified under (a) above; and (c) halogen bearing salts of the material identified under (a) above.

3. A lubricating composition containing as a principal lubricating constituent a major amount of mineral lubricating oil with the properties of such composition affecting its use as an extreme pressure lubricant under conditions of temperature and pressure such as normally exert a decomposing influence on organic halogen compounds improved by the inclusion in the composition of a minor amount, based on the amount of mineral lubricating oil, of a halogen bearing hydroxy organic composition selected from the class consisting of: (a) the halogen bearing product produced by first halogenating a fatty acid, then partially hydrolyzing the halogenated fatty acid to remove the relatively active halogen from the molecule and substituting a hydroxyl group in place thereof; (b) the halogen bearing products produced by forming esters of the material identified under (a) above; (c) halogen bearing salts of the material identified under (a) above; and (d) any of (a) (b) and (c) together.

4. A lubricating composition containing as a principal lubricating constituent a major amount of mineral lubricating oil with the properties of such composition affecting its use as a lubricant under conditions of pressure and temperature encountered in the lubrication of Diesel engines improved by the inclusion in the composition of from about 0.1% to about 2% by weight, based on the amount of oil, of a halogen bearing calcium salt of a partially hydrolyzed halogenated fatty acid.

CARL F. PRUTTON.